US010588325B2

(12) United States Patent
Sundgren et al.

(10) Patent No.: US 10,588,325 B2
(45) Date of Patent: Mar. 17, 2020

(54) MILK AND MILK-RELATED PRODUCTS

(71) Applicant: ARLA FOODS AMBA, Viby J (DK)

(72) Inventors: Anja Sundgren, Huddinge (SE); Colin Ray, Sundbyberg (SE); Jacob Holm Nielsen, Tjele (DK)

(73) Assignee: ARLA FOODS AMBA, Viby J (DK)

( * ) Notice: Subject to any disclaimer, the term of this patent is extended or adjusted under 35 U.S.C. 154(b) by 524 days.

(21) Appl. No.: 14/785,919

(22) PCT Filed: Apr. 25, 2014

(86) PCT No.: PCT/EP2014/058464
§ 371 (c)(1),
(2) Date: Oct. 21, 2015

(87) PCT Pub. No.: WO2014/174079
PCT Pub. Date: Oct. 30, 2014

(65) Prior Publication Data

US 2016/0058024 A1 Mar. 3, 2016

(30) Foreign Application Priority Data

Apr. 25, 2013 (EP) .................................... 13165347

(51) Int. Cl.
*A23C 9/12* (2006.01)

(52) U.S. Cl.
CPC ...... *A23C 9/1213* (2013.01); *A23C 2220/102* (2013.01); *A23C 2220/104* (2013.01); *A23C 2220/106* (2013.01)

(58) Field of Classification Search
CPC ........................................................ A23C 9/12
USPC ........................................................... 426/42
See application file for complete search history.

(56) References Cited

U.S. PATENT DOCUMENTS

2004/0151802 A1* 8/2004 Koka .................. A23C 9/1213 426/39
2007/0105200 A1* 5/2007 Budtz ................. A23C 9/1213 435/104
2007/0154595 A1 7/2007 Budtz et al.

FOREIGN PATENT DOCUMENTS

| | | |
|---|---|---|
| EP | 0997071 | 2/2001 |
| WO | WO 98/41102 | 9/1998 |
| WO | WO 99/09143 | 2/1999 |
| WO | WO 2006/134979 A1 | 12/2006 |
| WO | WO 2009/000972 | 12/2008 |
| WO | WO 2012/010699 | 1/2012 |

OTHER PUBLICATIONS

NPL D'Souza in "Immobilized enzymes in bioprocess" Current Science 77(1): pp. 69-79, 1999.*
International Search Report and Written Opinion in corresponding PCT Application No. PCT/EP2014/058464, dated Jul. 21, 2014.

* cited by examiner

*Primary Examiner* — Amber R Orlando
*Assistant Examiner* — Bhaskar Mukhopadhyay
(74) *Attorney, Agent, or Firm* — Leason Ellis LLP

(57) ABSTRACT

The invention relates to methods for reducing off-flavour in milk-related products, said methods comprising the step of oxidizing lactose in a milk-related product to lactobionic acid. The invention further relates to methods of producing packaged, milk-related products, as well as milk-related products produced by the said methods.

15 Claims, 2 Drawing Sheets

MILK AND MILK-RELATED PRODUCTS

CROSS-REFERENCE TO RELATED PATENT APPLICATIONS

This application is a U.S. National Phase Application under 35 U.S.C. § 371 of International Patent Application No. PCT/EP2014/058464, filed Apr. 25, 2014, and claims the priority of the International Application No. EP 13165347.9, filed Apr. 25, 2013, all of which are incorporated by reference in their entireties. The International Application was published on Oct. 30, 2014 as International Publication No. WO 2014/174079 A1.

TECHNICAL FIELD

The invention relates to methods for reducing off-flavour in milk and milk-related products. The invention further relates to methods of producing packaged, milk-related products, as well as milk-related products produced by the said methods.

BACKGROUND ART

Typically, milk and milk-related products are heat treated in order to inactivate undesirable enzymes and destroy pathogenic and spoilage microorganisms. The heating process may additionally cause physical and chemical changes (protein denaturation, browning, etc.), which positively or negatively affects the sensory characteristics and nutritional value of the products. Milk-related products may be treated by a range of processes which differ in the severity of the heat treatment.

The three general types of heat treatment (from mild to severe) are thermization, pasteurisation and sterilization. Thermization is a mild heat treatment (typically 57-68° C. for 15 sec.) sufficient to destroy gram-negative psychotropic vegetative microorganisms and increase the refrigerated shelf-life. Pasteurisation (typically 72° C. for 15 sec.) destroys most of the vegetative pathogenic organisms (bacteria, yeasts, and moulds), which may cause food poisoning. Sterilization is the most severe heat treatment (typically +121° C. for 3 min.) and destroys all microorganisms (vegetative and spores) or renders them incapable of further growth.

Ultra high temperature (UHT) processing is well-known in the prior art as a continuous flow process, where the milk is heated in excess of 135° C., held for approx. 4 sec, rapidly cooled, and aseptically packaged. UHT milk undergoes fewer chemical reactions than sterilized milk, resulting in a product that is whiter, tastes less caramelised, has reduced whey protein denaturation, and reduced loss of heat-sensitive vitamins.

Even so, the development of off-flavours, especially stale or oxidized flavour, during storage, is an important factor limiting the acceptability of UHT milk. This off-flavour development is associated with chemical reactions and changes (e.g. Maillard reaction and browning) that occur during processing and that continue during subsequent storage. The perceived poor flavour of UHT milk is one of the common problems faced by the dairy industry, since it is a strong barrier to consumer acceptance of UHT milk. For a review, see Al-Attabi, Z., D'Arcy, B. R. and Deeth, H. C. (2009) Critical Reviews in Food Science and Nutrition, 49: 28-47.

U.S. Pat. No. 4,053,644 discloses a process of treating fluid milk having a "cooked flavour".

The process comprises substantially removing the cooked flavour by contacting said fluid milk with immobilized sulfhydryl oxidase enzyme. However, sulfhydryl oxidase is not easily available and is used mainly in baking industry, thus unsuited for dairy products.

WO 99/09143 discloses the use of one or more oxidoreductases, in particular laccase, for the reduction of malodour in various products such as oral care products, hygiene products. Also mentioned are products for removing burned flavour from foods such as milk. However, laccase (DeniLite®; www.novozymes.com) has its main application in the textile industry and is not optimised for dairy products.

Consequently, there is a need for improved processes for reducing off-flavours in e.g. UHT milk, which involves the use of enzymes that are easily available and suitable for dairy products.

Lactose oxidase, a carbohydrate oxidase with high specificity of oxidizing the disaccharide lactose to lactobionic acid (LBA) has been disclosed by Ahmad et al. (2004) Regul. Toxicol. Pharmacol. 39(3): 256-270. LBA occurs naturally in certain fermented milks (Kiryu, T. et al. (2009) J. Dairy Sci. 92: 25-34). LBA is also used in specific applications within the food industry and may be used to increase cheese yield. Lactose oxidase is included in the product LactoYIELD® (www.chr-hansen.com).

DISCLOSURE OF THE INVENTION

Figure 1:
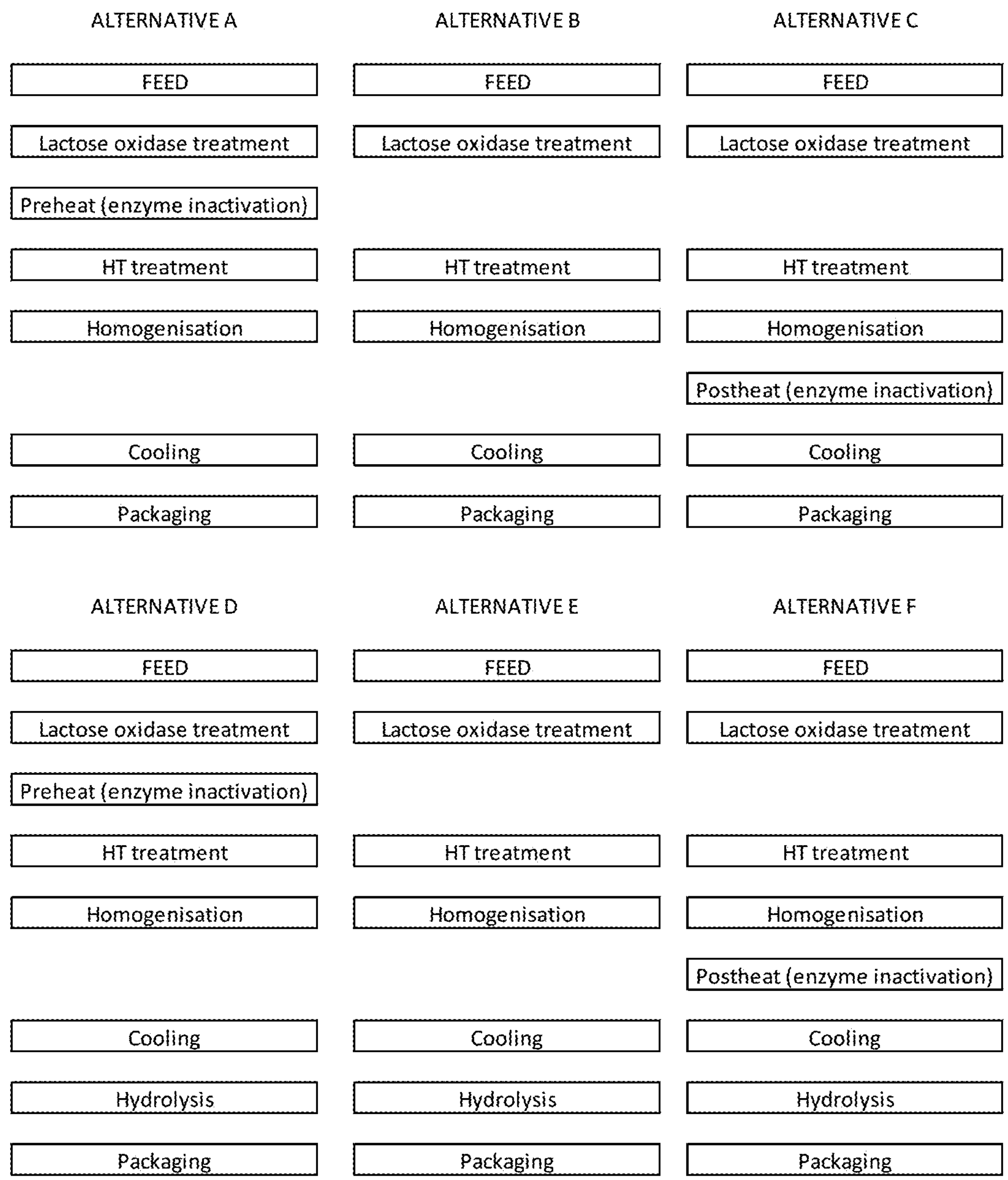
FIG. 1 is a schematic flow diagram of various embodiments of the invention. For instance, alternative B shows a process in which the milk-related product (FEED) is subjected to lactose oxidase treatment followed by high-temperature (HT) treatment, homogenisation, cooling and packaging. In alternatives A and D, an enzyme inactivation step ("Preheat") takes place immediately after the lactose oxidase treatment. In alternatives C and F, an enzyme inactivation step ("Postheat") takes place after the homogenisation step. Alternatives D, E and F include a "hydrolysis" step in which lactose is hydrolysed by contacting the milk-related product with a lactase enzyme.

It has surprisingly been found that a process for oxidising lactose in milk and milk-related products to lactobionic acid is effective for reducing off-flavour, e.g. "cooked" flavour, in a milk-related product, such as a high-temperature treated milk-related product. At the same time, it has been found that to maintain the flavour and shelf life of the milk-related product, lactose oxidising should be kept low.

Consequently, in one aspect, the invention provides a method for reducing off-flavour in a milk-related product, comprising the step of oxidizing part of lactose in the said milk-related product to lactobionic acid. 0.001-20% of the lactose may be oxidized, such as 0.01-10%, or 0.1-5%.

The milk/milk-related product is preferably a liquid milk/milk-related product. As used herein the terms "milk" and "milk-related product" encompass lactose-reduced whole milk, skim milk, fat-free milk, low fat milk, full fat milk, or concentrated milk. Fat-free milk is a non-fat or skim milk product. Low-fat milk is typically defined as milk that contains from about 1% to about 2% fat. Full fat milk often contains about 3.25% fat. As used herein, the term "milk" is also intended to encompass milks from animal and plant sources. Animal sources of milk include, but are not limited to, human, cow, sheep, goat, buffalo, camel, llama, mare and deer. In a preferred embodiment of the invention, the milk-related feed comprises bovine milk. Plant sources of milk include, but are not limited to, milk extracted from soybean.

Preferably, the said oxidation of lactose is catalysed by the enzyme lactose oxidase. The lactose oxidase can e.g. be added to the milk-related product and subsequently deactivated by heating. Alternatively, lactose oxidase can be immobilised on a support, i.e. the enzyme is not physically added to the milk-related product, but is still able to catalyse the formation of lactobionic acid. In the case of using an immobilised enzyme, there is no need for a subsequent inactivation step. Methods for using immobilised enzymes in dairy industry are well known in the art, e.g. from EP 0997071 and Pastore et al. (1974) Journal of Dairy Science 57: 269-272.

Preferably, between 0.1% and 5% (more preferably between 1% and 2%) of the lactose should be oxidised to lactobionic acid in the method according to the invention. Such a degree of oxidation will not affect the organoleptic quality of the treated milk. The term "organoleptic quality" refers to the qualities of the milk-related product as experienced by the senses, including taste, sight, and smell.

In a further preferred aspect, the invention provides a method of producing a milk-related product, including milk, the method comprising the steps of:

a) providing a milk-related product comprising lactose;
b) oxidising part of the lactose in the said milk-related product to lactobionic acid;
c) subjecting the milk-related product obtained in step (b) to high-temperature (HT)-treatment; and The milk-related product provided in (a) may be pasteurized.

In (b) 0.001-20% of the lactose may be oxidized, such as 0.01-10%, or 0.1-5%.

In a final step, the product may be packaged.

Preferably, the temperature of the milk-related product in step (b) is between +1° C. and +50° C., more preferably between +1° C. and +10° C., and most preferably about +8° C.

As discussed above, the oxidation is preferably catalysed by lactose oxidase which can be immobilised on a support or added to the milk-related product prior to step (b).

When lactose oxidase is added to the milk-related product, the lactose oxidase should preferably be in contact with the milk-related product for a time period of from 1 second to 6 hours, more preferably from 1 second to 30 minutes, and most preferably from 30 seconds to 15 minutes.

The concentration of lactose oxidase during the enzyme treatment step may be from 0.001% to 1% of the milk-related product, such as 0.01 to 0.5%. The concentration of lactose oxidase during the enzyme treatment step should preferably be from 0.01% to 0.1% of the milk-related product.

When lactose oxidase is added to the milk-related product, an enzyme inactivation step should preferably be included in the process. A suitable enzyme inactivation step comprises:

(i) adjusting the temperature of the milk-related product to a temperature in the range of from +70° C. to +95° C., preferably about +85° C.; and (ii) maintaining the said temperature for a time period in the range of from 30 to 500 seconds, preferably about 120 seconds.

As discussed in the Examples and illustrated in FIG. 1, the enzyme inactivation step could preferably take place either immediately after treatment with lactose oxidase (FIG. 1, alternatives A and D) or after the HT treatment/homogenisation step (FIG. 1, alternatives C and F).

The heating step (c) can comprise well-known UHT processes such as direct steam infusion (DSI); direct steam injection; or indirect heating. Suitable methods are described in e.g. Datta et al. (2002) Australian Journal of Dairy Technology 57: 211-227, as well as in references therein. For a reference to general aspects of HT-treatment of milk, see also "Ultra-high-temperature processing of milk and milk products" by H. Burton (ISBN 0-7514-0276-1).

Alternatively, the heating step (c) can comprise "short time—high temperature" process parameters as described in WO 2012/010699. With such a process, the temperature of the liquid product is rapidly increased, preferably by contacting the milk product with steam (steam injection or steam infusion). Heating could also be achieved by subjecting milk to electromagnetic energy, IR radiation and/or microwaves. Indirect heating could also be used.

Consequently, in one aspect of the invention, the high-temperature treatment in step (c) comprises:

(i) heating the milk-related product to a temperature in the range of from +135° C. to +180° C.;
(ii) maintaining the said temperature for a time period of from 25 milliseconds to 10 seconds; and
(iii) cooling the milk-related product.

In a preferred aspect of the invention, when standard UHT process parameters are used, the high-temperature treatment in step (c) comprises:

(i) heating the milk-related product to a temperature in the range of from +135° C. to +150° C., preferably about +143° C.;
(ii) maintaining the said temperature for a time period of from 2 to 10 seconds, preferably about 6 seconds; and
(iii) cooling the milk-related product.

In another preferred aspect of the invention, where "short time/high temperature" parameters are used, the high-temperature treatment in step (c) comprises:

(i) heating the milk-related product to a temperature in the range of from +140° C. to +180° C., preferably about +155° C.;
(ii) maintaining the said temperature for a time period of from 25 to 200 milliseconds, preferably about 100 milliseconds; and
(iii) cooling the milk-related product.

It is important that the heated product is rapidly cooled after the heat treatment. The preferred way of cooling is flash cooling. The term "flash cooling" is known in the art and means a process which comprises introducing the liquid into a vacuum chamber, whereby parts of the liquid evaporates and rapidly cools the remaining liquid. Suitable methods are described in e.g. Datta et al. (2002) Australian Journal of Dairy Technology 57: 211-227, as well as in references therein.

Optionally, the method of the invention includes a homogenisation step after HT treatment. Homogenisation methods are well known in the art and are described in e.g. "Dairy Technology: Principles of Milk Properties and Processes" by P. Walstra (ISBN 0824746414).

In another optional aspect of the invention, the method of the invention comprises hydrolysis at least some of the lactose of the HT-treated milk-related product. The hydrolysis of lactose may e.g. comprise contacting the HT-treated milk-related product with a lactase enzyme. Hydrolysis preferably takes place at a temperature between +1° C. and +50° C., more preferably around +20° C. FIG. 1, alternatives D-F, illustrates methods of the invention comprising a hydrolysis step.

In yet another aspect, the invention relates to a packaged, milk-related product obtainable by the methods as described above.

EXAMPLES OF THE INVENTION

Example 1: Preparation of Lactose Oxidase Treated Milk

Materials

Homogenized and low pasteurized bovine milk with a fat content of 1.5%.

Lactose oxidase (LactoYIELD®; www.chr-hansen.com).

Methods

LactoYIELD® was added under stirring to bovine milk in a 40 l. tank to a final concentration of 1%. Enzyme treatment was allowed to continue for various holding times (0.5 h, 3 h and 6 h, respectively) before heat treatment. The temperature of the mixture was +6-8° C. during the holding time.

Figure 3:
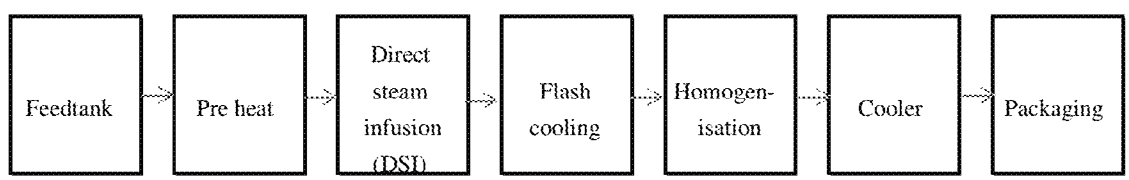
FIG. 3 is a schematic overview of the pilot plant process used for preparing heat-treated milk products according to the invention.

A pilot plant at Arla Foods, Sweden, was used for heat treatment of the product. A schematic overview of the plant is shown in FIG. 3. The milk was pumped from the feed tank to the preheater where it was heated to +85° C. and held for 120 sec before entering the infusion chamber in the direct steam infusion plant. The high-temperature (HT) treatment was performed at +155° C. for a holding time of 0.1 sec. After HT treatment the product was instantanly cooled using flash cooling. Homogenization of the samples (total pressure 200 bar) took place before final cooling to approximately +20° C. The samples were packaged in sterile glass bottles. A control sample with no added enzyme was processed in the same way.

Example 2: Sensory Analysis 12 trained members from the “Arla milk panel” participated in the sensory test. Milk samples, treated with lactose oxidase for 30 minutes or 6 hours before heat treatment, were prepared as described in Example 1. The samples were served to the sensory panel at +8° C. in transparent plastic cups with lids. The serving order was randomised.

The scale for each attribute went from 0 (“nothing”) to 10 (“extremely much of the attribute”). The panel members were also asked to describe any other flavours/off flavours in words.

TABLE II

Mean values from sensory profiling

| Attribute | Enzyme treatment control | 0.5 h | 6 h | ANOVA Significance level |
|---|---|---|---|---|
| milk/cream | 3.43 | 3.40 | 3.25 | |
| homeboiled milk | 3.65 | 1.37 | 1.87 | ** |
| egg/sulphur | 1.73 | 0.08 | 0.03 | *** |
| wax/tallow | 0.03 | 0.86 | 0.93 | |
| other off flavour | 0.69 | 1.21 | 1.22 | |

The results shown in Table II indicate that treatment with lactose oxidase, after either 0.5 h or 6 h treatment, reduces the “egg/sulphur” and “homeboiled milk” off flavour attributes, but does not significantly affect other attributes.

The off-flavours associated with heat treated milk are due to an additive combination of many aroma components including free thiol, volatile sulfur containing compounds, aldehydes and 2-ketones. The levels of 2-ketones levels are not affected by process of the invention and thus this contribution to the off-flavour profile remains after enzymatic treatment, leading to a slightly higher perceived intensity of this attribute (“wax/tallow”) in some panelists. However, the difference is not statistically significant between treated milk and non-treated milk. Overall, the final milk product has a significantly lower level of cooked flavour.

Example 3: Analysis of Free SH Groups (Ellman Assay)

Ellman's reagent; 5,5'-dithiobis-(2-nitrobenzoic acid) (DTNB; see also Ellman, G L (1959) Arch. Biochem. Biophys. 82: 70-77) was used according to standard protocols to quantify the concentration of thiol groups in samples from milk produced according to the invention.

Samples of bovine milk, prepared as described in Example 1, were treated with lactose oxidase according to the invention for 0.5 h; 3 h; or 6 h. No enzyme was added to the control samples.

Treated samples (600 μl) were mixed with 0.4 M $Na_3$-citrate (150 μl) and frozen prior to the analysis. Milk samples prepared as above (750 μl) were each mixed with 3 ml buffer (0.086 M Tris; 0.09 M glycine; 4 mM EDTA; 8 M Urea, pH 8.5) and incubated for 60 minutes at +37° C. DTNB solution (50 μl) was then added to milk samples (150 μl) on a microtiter-plate and the optical absorbance at 412 nm was measured after 3-5 minutes. Controls were mixed with 50 μl buffer (as above) instead of DTNB.

Figure 2:
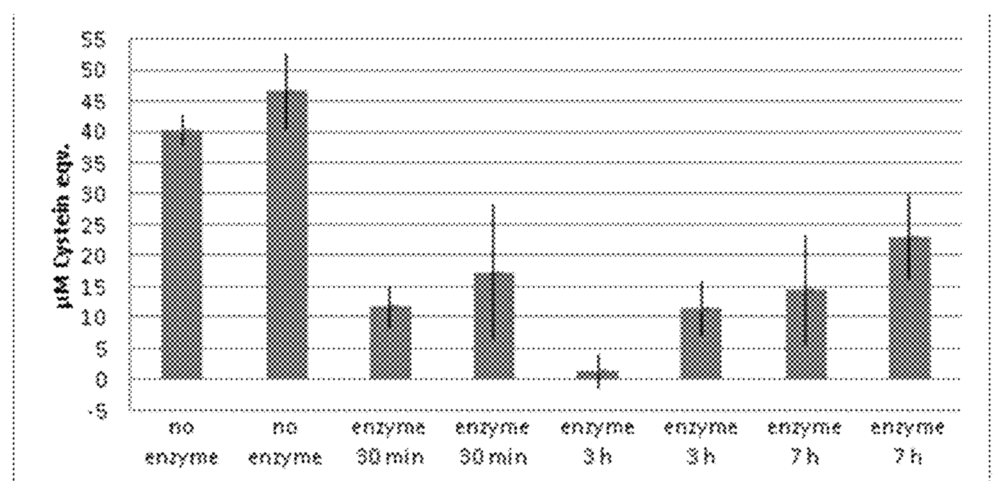
FIG. 2 is a graph showing free SH groups in samples of milk treated according to the invention. The concentration of free SH groups is expressed as "μM cysteine equivalents" as determined from the optical absorbance at 412 nm.

It was found that free thiol count was much lower for the enzyme pre-treated milk (FIG. 2). It is concluded that lactose oxidase lowers free thiol in the final milk which results in an improved taste.

Further, the results in FIG. 2 indicates that the holding time, i.e. the time period the milk-derived product is exposed to active enzyme, does not seem critical. A holding time of 30 minutes (0.5 h) appears sufficient for the oxidation process to take place.

The invention claimed is:

1. A method of producing a milk-related product, the method comprising the steps of:

a) providing a milk-related product comprising lactose;

b) oxidising 0.1-5% of the lactose in the milk-related product to lactobionic acid, wherein the oxidation is catalysed by lactose oxidase;

c) subjecting the milk-related product obtained in step (b) to high-temperature (HT)-treatment comprising:

(i) heating the milk-related product to a temperature in the range of from +135° C. to +180° C.;

(ii) maintaining the temperature for a time period of from 25 milliseconds to 10 seconds; and (iii) cooling the milk-related product, wherein the lactose oxidase is added to a concentration of 0.01-0.1% of the milk-related product, and wherein home-boiled milk and egg/sulphur off-flavours in the milk-related product are reduced while shelf life and flavour of the milk-related product are maintained.

2. The method according to claim 1 wherein the temperature of the milk-related product in step (b) is between +1° C. and +50° C.

3. The method according to claim 1, wherein the lactose oxidase is immobilised on a support.

4. The method according to claim 1, wherein the time period of oxidising in step (b) is 1 s-30 minutes.

5. The method according to claim 1, further comprising subjecting the milk-related product comprising lactose oxidase to an enzyme inactivation step.

6. The method according to claim 5, wherein the enzyme inactivation step comprises:

(i) adjusting the temperature of the milk-related product to a temperature in the range of from +70° C. to +95° C.; and (ii) maintaining the temperature for a time period in the range of from 30 to 500 seconds.

7. The method according to claim 6, wherein step (i) comprises adjusting the temperature of the milk-related product to a temperature of about +85° C.

8. The method according to claim 6, wherein step (ii) comprises maintaining the temperature for a time period of about 120 seconds.

9. The method according to claim 1, wherein the high-temperature treatment in step (c) comprises:

(i) heating the milk-related product to a temperature in the range of from +135° C. to +150° C.;

(ii) maintaining the temperature for a time period of from 2 to 10 seconds; and (iii) cooling the milk-related product.

10. The method according to claim 1, wherein the high-temperature treatment in step (c) comprises:

(i) heating the milk-related product to a temperature in the range of from +140° C. to +180° C.;

(ii) maintaining the temperature for a time period of from 25 to 200 milliseconds; and (iii) cooling the milk-related product.

11. The method according to claim 1, in addition comprising contacting the HT-treated milk-related product obtained in step (c) with a lactase enzyme.

12. A method for reducing off-flavour in a milk-related product, comprising the steps of:

a) providing a milk-related product comprising lactose;

b) oxidising 0.1-5% of the lactose in the milk-related product to lactobionic acid, wherein the oxidation is catalysed by lactose oxidase;

c) subjecting the milk-related product obtained in step (b) to high-temperature (HT)-treatment comprising:

(i) heating the milk-related product to a temperature in the range of from +135° C. to +180° C.;

(ii) maintaining the temperature for a time period of from 25 milliseconds to 10 seconds; and (iii) cooling the milk-related product, wherein the lactose oxidase is added to a concentration of 0.01-0.1% of the milk-related product, and wherein home-boiled milk and egg/sulphur off-flavours in the milk-related product are reduced while shelf life and flavour of the milk-related product are maintained.

13. The method according to claim 1, comprising a final step of packaging the milk product.

14. The method according to claim 12, comprising a final step of packaging the milk product.

15. The method according to claim 2, wherein the temperature of the milk-related product in step (b) is between +1° C. and +10° C.

* * * * *